United States Patent Office 3,462,453
Patented Aug. 19, 1969

---

3,462,453
HALOGENATED ORGANIC COMPOUNDS
Ivan C. Popoff, Ambler, and Bernard Loev, Philadelphia, Pa., assignors to Pennsalt Chemical Corporation, Philadelphia, Pa., a corporation of Pennsylvania
No Drawing. Original application Mar. 28, 1958, Ser. No. 724,527. Divided and this application July 26, 1966, Ser. No. 604,078
Int. Cl. C07d 27/22, 5/16, 63/12
U.S. Cl. 260—332.5         4 Claims

ABSTRACT OF THE DISCLOSURE

Heterocyclic compounds selected from the group of furan, pyrrole, and thiophene containing the dichlorocyclopropyl group attached directly to a carbon atom in the heterocyclic ring. These compounds have utility as agricultural chemicals, lubricants, oil additives and pharmaceuticals.

---

This application is a divisional of Ser. No. 724,527, filed Mar. 28, 1958 now abandoned.

This invention relates to new compounds containing the dichlorocyclopropyl group

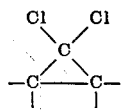

and certain derivatives of these compounds.

Saturated compounds containing the dichlorocyclopropyl group and the corresponding dibromocyclopropyl group:

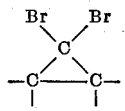

such as 1,2-dimethyl-3,3-dichlorocyclopropane

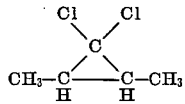

or 1,2 dimethyl-3,3-dibromocyclopropane

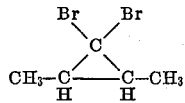

are known. Compounds of this type are characterized by unusual chemical inertness. Since they are saturated compounds, however, and contain no reactive substituents they have limited utility since it is difficult to convert them to desired derivatives.

A new series of compounds of excellent utility have now been found which contain the dichlorocyclopropyl group

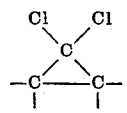

together with a neighboring carbon to carbon double bond. Compounds of this type are useful in themselves but are particularly unique in the fact that they may be readily converted to derivatives in which the inert dichlorocyclopropyl group is directly adjacent to a functional group such as a carboxylic acid group, an amine group, a vinyl benzene group, etc. as will be explained more in detail hereafter.

Specifically the new compounds are characterized by the presence of a

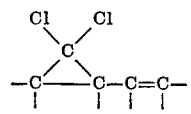

group wherein the

group may be either olefinic (that is, having a nonaromatic carbon to carbon double bond) or may be part of an aromatic ring. The carbons of the -dichlorocyclopropyl group

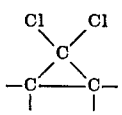

are other than those in an aromatic ring. The term "aromatic ring" as used herein includes carbocyclic rings of the benzene series, including for example benzene, naphthalene, anthracene etc. and heterocyclic rings of the furan, pyrrole, thiophene and pyridine series, which in common with those of the benzene series differ from aliphatic unsaturated compounds by their stability to oxidation and tendency to undergo substitution rather than addition reactions.

An especially unique and surprising feature of compounds of this type is their excellent stability despite the presence of the double bond in neighboring relationship to the dichlorocyclopropyl group. While both the dichloro-cyclopropyl and the dibromo-cyclopropyl compounds in the saturated series are unusually stable, it has been found surprisingly that in the presence of a neighboring double bond, only the dichloro-cyclopropyl compounds are stable. The corresponding dibromo-cyclopropyl compounds, such as that prepared by the reaction of bromoform with butadiene, are often so unstable that they cannot be kept for more than a brief period before decomposition sets in as evidenced by rapid coloration of the product by liberated bromine. The corresponding dibromo compounds thus have little or no utility either in themselves or as intermediates. For example, while some of the dichloro compounds of the invention have pharmaceutical uses, such as in neurological applications, the dibromo compounds are useless in this regard because of their rapid decomposition. While the dichloro compounds of the invention can be subjected to reactions such as oxidation, hydrohalogention, hydrolysis, nitration, etc. without destroying the dichlorocyclopropyl group, the dibromocyclopropyl group will generally undergo rapid decomposition if such reactions are attempted with the corresponding dibromo compounds.

A preferred class of dichlorocyclopropyl compounds of the above general class are those in which the double bond neighboring to the dichlorocyclopropyl group is olefinic (i.e. non-aromatic) such as in the following olefins:

(1) 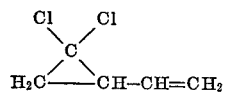

(2) 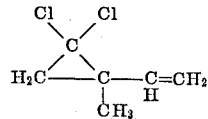

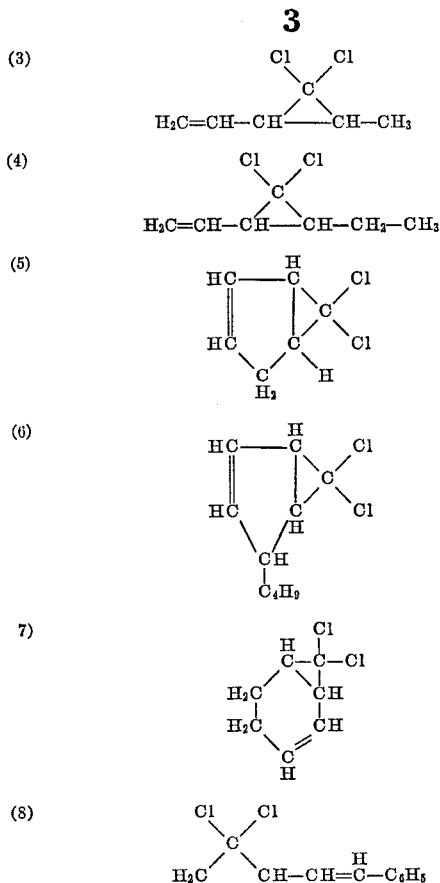

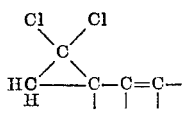

and the like. Compounds of this type having from five to 20 carbon atoms are particularly preferred, especially those containing only carbon, hydrogen and chlorine. Particularly preferred among these olefinic compounds are those in which the dichlorocyclopropyl group is terminal in the molecule; that is, compounds containing a

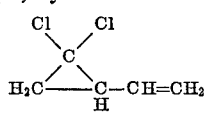

group in which the carbon to carbon double bond is olefinic (i.e. is not part of an aromatic ring). Compounds (1) to (4) above are particularly preferred compounds of this latter type.

These olefinic compounds are particularly valuable in that they may serve as intermediates for the preparation of derivatives in which a functional group is introduced into the molecule, particularly where the functional group is introduced directly adjacent to the inert dichlorocyclopropyl group. By addition reactions at the olefinic double bond such as the addition of H₂S or hydrogen halides, for example, a mercapto group or halide respectively may be formed adjacent to the dichlorocyclopropyl group, or by oxidation, an aldehyde or acid group may be formed at the double bond with accompanying cleavage at this point. For example, by oxidation of compounds such as

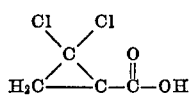

acids such as (image of dichlorocyclopropyl carboxylic acid structure)

may be formed. Such derivatives, and their preparation are described in more detail hereinafter.

Another class of dichlorocyclopropyl compounds within the scope of the invention are those in which the double bond neighboring to the dichlorocyclopropane group is a double bond in a carboxylic aromatic ring (that is part of a carboxylic aromatic ring) such as in the following compounds:

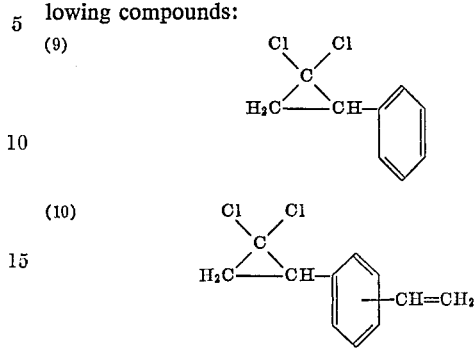

(particularly when the vinyl group is ortho or para to the dichlorocyclopropyl group)

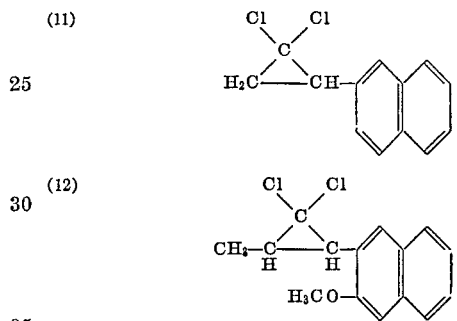

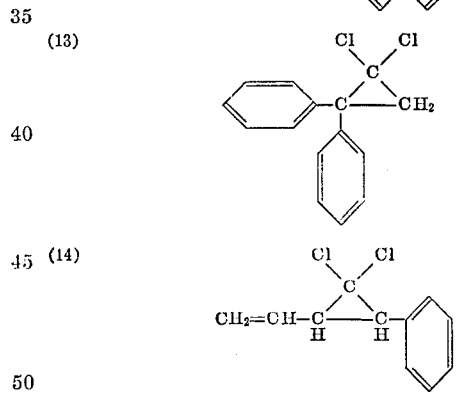

The last compound (14) it will be noted contains both aromatic and olefinic unsaturation neighboring to the dichlorocyclopropyl group.

These aromatic compounds having the inert dichlorocyclopropyl group attached directly to the aromatic group can be converted to valuable derivatives by subjecting the compound to the usual reactions of which an aromatic ring is susceptible such as sulfonation, nitration, alkylation, halogenation, and the like.

Still another class of dichlorocyclopropyl compounds within the scope of the invention are those in which the double bond neighboring to the dichlorocyclopropyl group is a double bond in a heterocyclic aromatic ring (that is, part of a heterocyclic aromatic ring) such as in the following compounds: (a heterocyclic aromatic ring refers to a ring of the furan, pyrrole, pyridine or thiophene series)

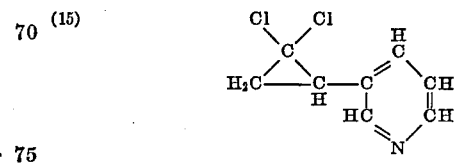

(16) 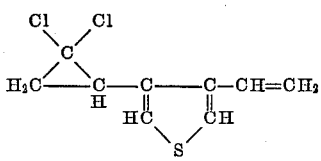

(17) 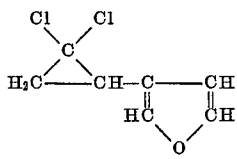

The latter heterocyclic compounds containing the inert dichlorocyclopropyl group attached directly to the heterocyclic ring may be subjected to most of the usual reactions undergone by these heterocyclic systems without affecting the inert dichlorocyclopropyl group.

Any of the above compounds and in general any of the compounds of the invention may contain various substituent groups. These may have been present in the original olefin from which the dichlorocyclopropyl compound is formed, or may be formed after the dichlorocyclopropyl group is introduced. Thus, relatively inert substituents such as alkoxy, alkylmercapto, chloro, dialkylamino and similar substituents may be present in the original olefin from which the dichlorocyclopropyl compound is formed while relatively reactive substituents such as nitro, carboxy, amino and the like may be introduced after the formation of the dichlorocyclopropyl compound.

The new compounds of the invention may be prepared by reacting chloroform, CHCl₃, with a compound containing conjugated carbon to carbon double bonds in which at least one of the conjugated double bonds is olefinic in character (that is, not a part of an aromatic ring). Thus, conjugated diolefins, such as butadiene, isoprene, or piperylene, or 1-ethylbutadiene may be reacted with chloroform to form compounds (1), (2), (3), (4), respectively. Non-aromatic cyclic diolefins, such as cyclopentadiene, butylcyclopentadiene, or 1,3-cyclohexadiene may be reacted with the chloroform to form compounds (5), (6) and (7) respectively, as given above. Also, compounds in which an olefinic double bond is conjugated with an aromatic double bond such as vinyl substituted aromatic compounds may be reacted with chloroform to provide new compounds according to the invention. Thus, styrene, divinylbenzene, vinylnaphthalene, 3-methoxy-2-(1-propenyl) naphthalene, diphenylethylene or 4-phenyl-1,3-butadiene, may be reacted with chloroform to give the above compounds (9), (10), (11), (12), (13) and (14) respectively. Furthermore, heterocyclic compounds of the aromatic type, such as vinylpyridine, divinylthiophene, or vinylfuran may be reacted with chloroform to give the above compounds (14), (15), (16) and (17).

The reaction should be carried out in the presence of an alkali metal alkoxide such as potassium tertiary butoxide, sodium methoxide, or potassium tertiary-amylate. The preferred alkali metal alkoxide is potassium tertiary butoxide. For best results the reaction should be carried out under anhydrous conditions.

The solvent for the reaction may be an alcohol, and preferably an alcohol corresponding to the alkali metal alkoxide, particularly tertiary butyl alcohol. Excess chloroform may also be employed as the solvent. Under some circumstances, other inert solvents may be employed such as, benzene, diethyl ether, dioxane, petroleum ether and the like.

The reaction is generally carried out over the temperature range of from −50° C. to +100° C. although lower temperatures can be used where required in the handling of low boiling compounds. The preferred temperature range is −20° C. to +40° C. The reaction may be carried out at subatmospheric, atmospheric or super-atmospheric pressures, although in most instances the reaction is readily carried out at atmospheric pressures, and atmospheric pressures are accordingly preferred.

The starting olefin may contain such relatively inert functional groups as alkoxy, chloromethyl, alkylmercapto, chloro, dialkylamino, and the like which do not react under the above reaction conditions. For example, the reaction may be carried out using as the starting olefin anethole, 1,4 - divinyl - 2-dimethylamino-benzene, 1-ethylmercapto - 2 - vinylnaphthalene, 1-vinyl-4-chloronaphthalene, 6-butoxy-1,3-hexadiene and the like. Substituents such as amino (NH₂), acyl halide, carboxy (COOH) or the like which might react under the above reaction conditions should not generally be present in the starting olefin. As explained above, these may be introduced into the dichlorocyclopropyl compound after its formation.

In a typical reaction procedure, anhydrous chloroform is gradually added to a suspension of potassium butoxide in a solution of the olefin in tertiary butyl alcohol at from −5 to +10° C. After the addition, stirring is continued for about an additional hour and the product is worked up by usual procedures. In some instances it is preferable to reverse the procedure by gradually adding a suspension of the alkoxide in the corresponding alcohol to a solution of the olefin in chloroform.

While the invention does not depend upon any particular explanation of the mechanism of the reaction, it is believed that the reaction proceeds through a dichlorocarbene (:CCl₂) intermediate as follows:

(1) $\quad CHCl_3 + RO^{\ominus} \longrightarrow ROH + CCl_3^{\ominus}$ (2) $\quad CCl_3^{\ominus} \longrightarrow Cl^{\ominus} + :CCl_2$ (3) 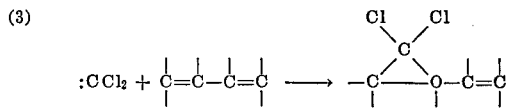

According to Equation 1, in the presence of the alkoxide (RO⁻) the trichloromethylcarbanion (CCl₃)⁻ is formed. This further disassociates into a chloride ion (Cl⁻) and dichlorocarbene (:CCl₂) (Equation 2). The dichlorocarbene then adds across the olefinic double bond to form the dichlorocyclopropyl group.

Assuming the above mechanism, it would not be possible to predict whether a 1,2- or 1,4-addition to a conjugated diolefin would occur to form a cyclopropyl or a cyclopentenyl ring respectively. However, it has been determined that the 1,2-addition takes place to the substantial exclusion of the 1,4-addition to form the dichlorocyclopropyl ring as illustrated in the above equations.

EXAMPLE 1

A suspension of 366 grams (3.27 moles) of

KOC(CH₃)₃ in 148 grams (2.0 moles) of HOC(CH₃)₃, 3000 ml. of diethyl ether, and 900 grams (16.65 moles) of butadiene is placed in a 4 neck flask equipped with a stirrer, thermometer well, dropping funnel, and Dry Ice condenser equipped with a CaCl₂ drying tube. The flask and contents is cooled down to −5° C. Over a period of 1.5 hours there is added slowly 490 grams (4.1 moles) of chloroform (CHCl₃) while stirring and while keeping the reaction temperature at −3° C. to 0° C. The reaction mixture is stirred for an additional hour at 0° C. to 5° C. and for another hour at 5° C. to 10° C.

The Dry Ice condenser is replaced with a fractionating column and the excess butadiene is distilled off. The residue is filtered and the filtrate fractionated.

There is obtained 188 grams (60% yield based on unrecovered CHCl₃) of 1,1-dichloro-2 vinylcyclopropane

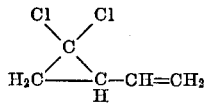

having a boiling point of 125° C. at 760 mm. Hg, a refractive index $n_{25}^D$ 1.4720. Infrared analysis of this product shows the bands characteristic of the cyclopropyl and the vinyl groups. The compound was analyzed as follows.

Calculated: 43.7% C, 4.37% H, 51.8% Cl. Found: 43.8% C, 4.79% H, and 50.8% Cl.

In addition to the 1,1-dichloro-2-vinylcyclopropane there is obtained 17.5 grams of a high boiling material which is shown to be 2-(2',2'-dichlorocyclopropyl)-1,1-dichlorocyclopropane

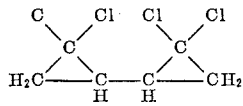

EXAMPLE 2

Using the procedure described in Example 1, 2.5 moles of chloroform was reacted with 6 moles of isoprene in the presence of 2 moles of $KOC(CH_3)_3$. The product is worked up as described in Example 1 to give a yield of about 45% based on unrecovered $CHCl_3$ of

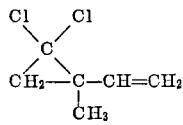

along with minor amounts of

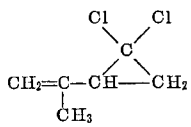

Upon infrared analysis, these products show the characteristic cyclopropyl and vinyl absorption bands.

EXAMPLE 3

In a four necked flask equipped as in Example 1, there is placed a solution of 650 grams (5 moles) of commercial grade divinylbenzene in 240 grams (2 moles) of $CHCl_3$. The divinylbenzene is a mixture having a narrow boiling range and containing the various divinylbenzene isomers (predominately ortho and meta with some para) as well as some ethyl vinylbenzene. The flask and contents are chilled and 250 grams (2 moles) of a suspension of potassium tertiary amylate in hexane is gradually added to the chilled solution. The reaction temperature is maintained at 15° C. by means of a cooling bath. After the addition is complete, the reaction is stirred another hour at 15° C. and overnight at 25° C. The salt (KCl) is filtered off, and the solution is then washed with water, dried and distilled in vacuo.

After removal of the unreacted divinylbenzene and ethyl vinylbenzene, a fraction is obtained consisting of the various isomers (predominately ortho and para) of (2,2-dichlorocyclopropyl)-vinylbenzene

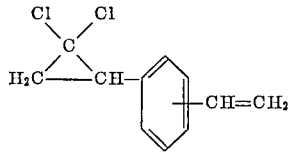

and (2,2-dichlorocyclopropyl)-ethylbenzene

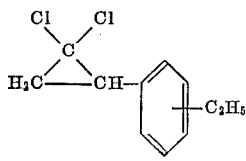

followed by a higher boiling product consisting of a mixture of the various isomers of bis-(2,2-dichlorocyclopropyl)benzene

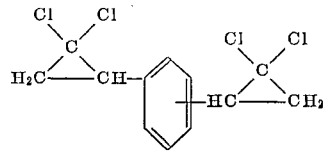

This latter material forms a glass when cooled in a Dry Ice-acetone bath.

EXAMPLE 4

A solution of 3 moles of 2-(1-propenyl)-3-methoxy-naphthalene in 2.5 moles of $CHCl_3$ is slowly added with stirring to 2.2 moles of potassium tertiary butoxide suspended in 1000 ml. of tertiary butanol and 2 additional moles of the olefin 2-(1-propenyl)-3-methoxy naphthalene. The temperature is maintained at 25° C. during the addition which requires 3 hours. Following the addition, the reaction mixture is stirred an additional hour and then poured into water.

The organic layer is separated, dried and the solvent and unreacted olefin removed, leaving a semi-solid which is recrystallized from acetone to give a solid product having the structure 3-methoxy-2-(2,2-dichloro-3-methylcyclopropyl)-naphthalene

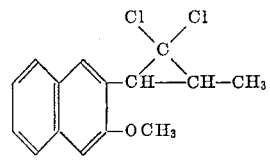

EXAMPLE 5

A suspension of 1 mole of potassium tertiary butoxide in ether is added slowly to a mixture of 2 moles of 3-vinylthiophene and 2 moles of chloroform while maintaining the reaction mixture at 0° C. during the addition. Stirring was continued for an additional several hours at 10° C. The product was worked up and isolated in the same manner as described in Example 3. The product, 3-(2',2'-dichlorocyclopropyl)-thiophene is a stable liquid.

The compounds of the invention have utility in themselves as herbicides, insecticides, particularly as fumigants; bactericides, lubricants, plasticizers, lube oil additives and pharmaceuticals. The compound 1,1-dichloro-2-vinylcyclopropane, for example, has been shown to have neurological activity. These compounds, particularly 1,1-dichloro-2-vinylcyclopropane may also serve as monomers for the preparation of high molecular weight polymers having good flame resistance due to the presence of the dichlorocyclopropyl group.

The compounds of the invention in which the double bond adjacent to the dichlorocyclopropyl group is olefinic in character are particularly useful as starting materials for the formation of derivatives by introduction of a carboxyl, aldehyde or hydroxyl group in a position directly adjacent to the inert dichlorocyclopropyl group.

These types of reactions proceed in general as follows:

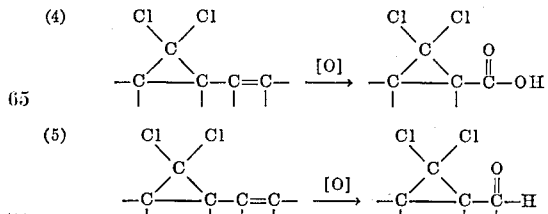

In Equation 4 oxidation to the acid is illustrated. Cleavage occurs at the double bond neighboring to the dichlorocyclopropyl group with a formation of the carboxyl group at this point. Equation 5 illustrates the formation of the aldehyde which also involves cleavage at the neighboring double bond with the formation of the aldehyde. By reduction of the aldehyde in the usual manner the corresponding alcohol may be formed.

The oxidation to the acid may be readily carried out by use of standard oxidizing agents, such as potassium permanganate or potassium dichromate. A particularly advantageous method of oxidation involves the use of ozone to form an ozonide at the double bond. The ozonide, on treatment with hydrogen peroxide, gives the corresponding acid. This reaction may be illustrated in the case of the compound 1,1-dichloro-2-vinylcyclopropane as follows:

(6)

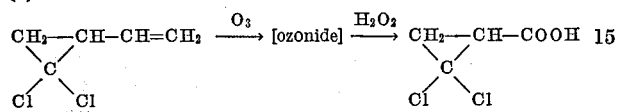

In the case of the compound (2,2-dichlorocyclopropyl) vinyl benzene this reaction may be illustrated as follows:

(7)

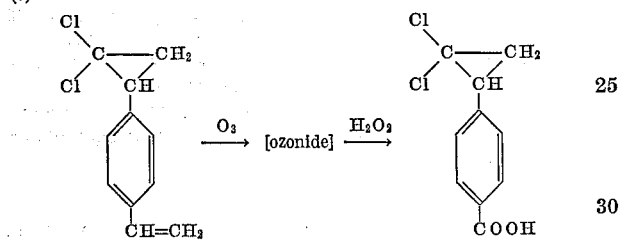

The aldehyde may also be produced from the ozonide by catalytic hydrogenation of the latter using a platinum on charcoal catalyst. In the case of the compound 1,1-dichloro-2-vinylcyclopropane, this reaction may be illustrated as follows:

(8)

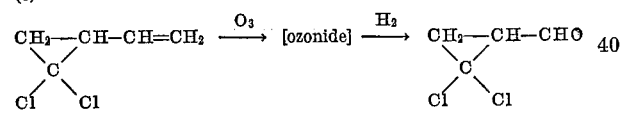

An alternative method of synthesis of the aldehyde involves the formation of the glycol as an intermediate. The glycol may be prepared by oxidation of the double bond by $OsO_4$, by the use of performic acid, or by the use of silver iodobenzoate (Prevost reagent) and the like. The glycol may be oxidized to the aldehyde by the use of $HIO_4$, lead tetraacetate, etc. This example of synthesis of the aldehyde may be illustrated, in the case of the compound 1,1-dichloro-2-vinylcyclopropane, using a performic acid catalyst to form the glycol, followed by oxidation of the glycol with lead tetraacetate, as follows:

(9)

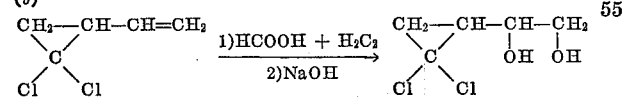

(10)

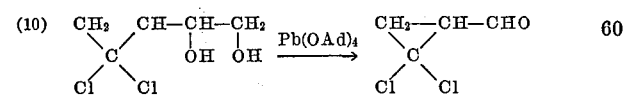

It will be noted that the formation of the acids, aldehydes and alcohols in the manner described above results in the introduction of the functional group (that is the carboxyl, aldehyde or hydroxyl group respectively) directly adjacent to the dichlorocyclopropyl ring without any intervening methylene ($CH_2$) groups. Compounds of this type, particularly where the dichlorocyclopropyl group is terminal in the molecule, such as in

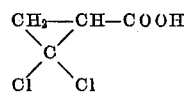

are particularly valuable because they provide the combination of a reactive functional group attached directly to the inert dichlorocyclopropyl group. By further reaction of the acid, aldehyde or alcohol, it is then possible to introduce the dichlorocyclopropyl group into other molecules without intervening methylene groups which might otherwise represent a weak point. For example, the acid

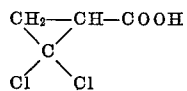

may be employed to acylate cotton or cellulose to provide flame resistance and increased chemical stability.

EXAMPLE 6

A solution of 10 grams of 1,1-dichloro-2-vinylcyclopropane in ethyl acetate is ozonized by passing a stream of oxygen containing about 3% ozone into the solution at —40° C. The resulting ozonide solution is refluxed with 35% hydrogen peroxide. The solvent and water are then removed by vacuum distillation. The residual viscous oil slowly crystallizes. After recrystallization from a benzene-ligroin mixture, the product 2,2-dichloro-1-cyclopropane-carboxylic acid

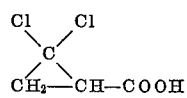

has a melting point of about 77° C.

EXAMPLE 7

A solution of 15 grams of (2,2-dichlorocyclopropyl) vinylbenzene in ethyl acetate is ozonized by passing a stream of ozone into the solution at a temperature of about 0° C. Care is taken not to use excess ozone to avoid attack of the aromatic ring. The ozonide solution is then refluxed with 35% hydrogen peroxide, and the solvent and water are removed by vacuum distillation, leaving a waxy solid, (2,2-dichlorocyclopropyl)benzoic acid,

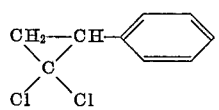

EXAMPLE 8

A solution of 10 grams of 1,1-dichloro-2-vinylcyclopropane in ethyl acetate is ozonized as described in Example 6. The ozonide is then catalytically reduced under a slight hydrogen pressure using about 0.1 gram of palladium on-charcoal hydrogenation catalyst containing approximately 5% palladium. The solvent is stirpped off by vacuum distillation and the aldehyde 2,2-dichloro-1-cyclopropane aldehyde

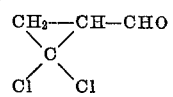

is steamed distilled and may be isolated from the distillate as the methone derivative.

EXAMPLE 9

The aldehyde prepared as in Example 8 is dissolved in acetic acid and hydrogenated over a period of 3 hours using a platinum on-charcoal hydrogenation catalyst containing about 5% platinum. The alcohol, 1-hydroxymethyl-2,2-dichlorocyclopropane

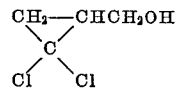

is isolated from the reaction mixture by vacuum distillation.

Difunctional acids, aldehydes, amines, and the like containing the dichlorocyclopropyl group may be prepared for example by oxidation of a cycloaliphatic dichlorocyclopropyl containing compound such as

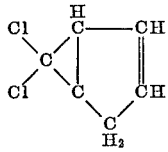

to give for example the diacid:

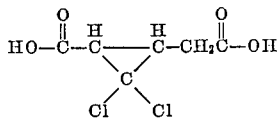

or the corresponding dialdehyde. By well-known methods, the diacid may be converted to the diamine or the dialdehyde converted to the dialcohol. Such difunctional compounds are useful intermediates for condensation reactions to give polyesters (by reaction of the diacid and dialcohol), polyamides (by reaction of the diacid and diamine) and the like containing the inert dichlorocyclopropyl group.

The compounds of the invention which contain an olefinic double bond in addition to the dichlorocyclopropyl group are also useful in that the olefinic double bond may undergo various addition reactions to introduce functional groups such as mercapto, halo, hydroxy, amino, epoxy, and the like.

Thus, for example hydrogen sulphide and mercaptans may be added to the double bond either in the "normal" (Markownikoff) manner or in the "abnormal" (anti-Markownikoff) manner, to provide a mercapto group on the carbon atom directly adjacent to, or on the carbon atom next adjacent to, the dichlorocyclopropyl group. The abnormal addition may be catalyzed by free radical initiators such as peroxides or ultra violet light. The normal addition may be catalyzed by acids. Equation 11 below illustrates the normal addition, while Equation 12 illustrates the abnormal addition of hydrogen sulphide and mercaptans to the compound, 1,1-dichloro-2-vinylcyclopropane:

(11)

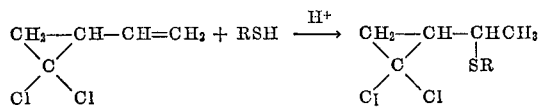

(12)

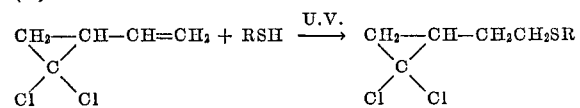

where R may be an organic radical, such as alkyl, or hydrogen.

When H₂S is used, the product may be either a mercaptan or a sulphide or a mixture, depending upon the ratio of H₂S to olefin, the higher ratios of H₂S to olefin tending to give the mercaptan as the major product.

Hydrogen halides can also be added in either the "normal" (Equation 13) or "abnormal" (Equation 14) manner, these addition reactions being illustrated in the case of HBr and the compound 1,1-dichloro-2-vinylcyclopropane as follows:

(13)

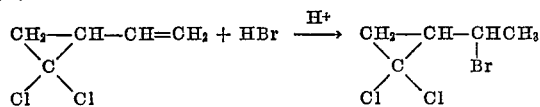

(14)

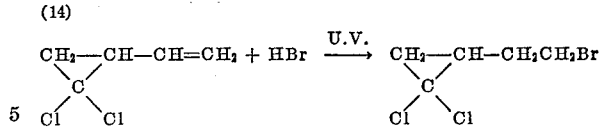

The double bond will also react with halogens in the normal manner to give vicinal, dihalides, this reaction being illustrated in the case of chlorine and 1,1-dichloro-2-vinylcyclopropane as follows:

(15)

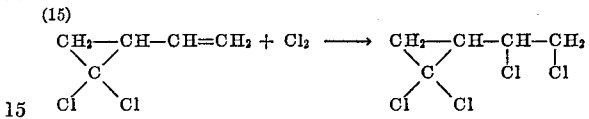

These olefinic compounds may undergo other addition reactions typical of simple olefins. For example, an alcohol may be formed by first forming the sulphuric acid ester followed, by hydrolysis of the ester to the alchol. Oxygen may be added at the double bond to give ethylene oxide type derivatives, (most conveniently by reaction with a peracid): hypohalous acids e.g. hypochlorous, as well as bisulfites, ammonia, amines, and phenols may also be added by standard techniques. The double bond may also be reduced by catalytic hydrogenation.

The following examples illustrate respectively the addition of hydrogen sulphide, a mercaptan, a hydrogen halide and a halogen.

EXAMPLE 10

1,1-dichloro-2-vinylcyclopropane is placed in a quartz test tube and cooled to 0° C. Hydrogen sulphide is bubbled through the compound while it is maintained at this temperature. A 350 watt ultra-violet light is placed close to the test tube during the reaction. At the end of about two hours, the liquid in the test tube consists of a mixture of the unreacted starting olefin, 2-(2,2-dichlorocyclopropyl) ethanethio-1.

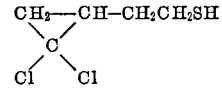

and 2-(2,2-dichlorocyclopropyl)-ethyl sulphide

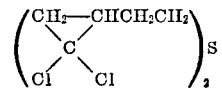

When the reaction is carried out under pressure and with an acid catalyst, such as phosphoric acid on kieselguhr, the secondary mercaptan,

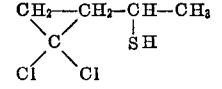

and sulfide,

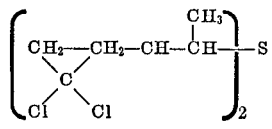

result.

EXAMPLE 11

An equimolar mixture of 1,1-dichloro-2-vinylcyclopropane and normal-propyl mercaptan and 10% by weight (based on the reactants) of phosphoric acid is placed in an autoclave and heated to 100° C., while stirring, under autogenous pressure. The product, n-propyl 1-(2,2-dicyclopropyl) ethyl sulphide.

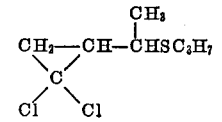

is obtained.

EXAMPLE 12

50 grams of 1,1-dichloro-2-vinylcyclopane is dissolved in 100 ml. of glacial acetic acid. While the solution is maintained at 25° C. gaseous hydrogen chloride is passed therethrough for 4 hours with stirring. The resulting product 1-(1-chloroethyl)-2,2-dichlorocyclopropane,

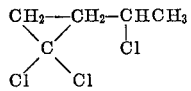

is isolated by vacuum distillation.

EXAMPLE 13

Equal volumes of 1,1-dichloro-2-vinylcyclopropane and carbon tetrachloride are placed in a flask and maintained at 0° C. Gaseous chlorine is passed through the solution until no further gain in weight is noted. The solvent and dissolved chlorine are removed by distillation in vacuo to obtain the product 1-(1,2-dichloroethyl)-2,2-dichlorocyclopropane,

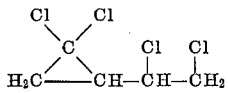

Another valuable derivative that may be obtained from the compounds of the invention which contain an olefinic double bond are those in which another dichlorocarbene (:CCl₂) is added to the double bond to form a bis(dichlorocyclopropyl) derivative. Derivatives of this type may be formed by further reacting the olefin containing dichlorocyclopropyl compounds of the invention with chloroform under the same reaction conditions described above to introduce the second dichlorocyclopropyl group. Alternatively, and more conveniently, the bis(dichlorocyclopropyl) derivatives may be prepared by reacting a conjugated diolefin such as butadiene, isoprene divinyl benzene etc. with an excess of chloroform and the alkali metal alkoxide. If both the chloroform and alkali metal alkoxide are both present in relatively large excess, the bis(dichlorocyclopropyl) compound will be the predominant product. Other conditions as described above may be the same. This latter reaction is illustrated by the following example employing butadiene and an excess of chloroform and alkali metal alkoxide.

EXAMPLE 14

A suspension of 366 grams of KOC(CH₃)₃ in 148 grams of HOC(CH₃)₃, 300 ml. of diethyl ether, and 108 grams (2.0 moles) of butadiene is cooled to −5° C. 490 grams of chloroform is added slowly to the mixture over a period of 1½ hours while stirring and keeping the reaction temperature at about 0° C. The reaction mixture is stirred for an additional hour at this temperature and for another hour at a temperature of about 5 to 10° C.

Excess chloroform is distilled off under vacuum. The residue is filtered and the filtrate fractionated to obtain a yield of about 40% (based on butadiene) of the bis (dichlorocyclopropyl) compound 2-(2,2-dichlorocyclopropyl) 1,1-dichlorocyclopropane,

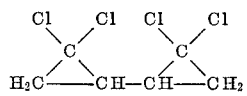

and about a 10% yield of the mono-dichlorocyclopropyl compound 1,1-dichloro-2-vinylcyclopropane.

The bis(dichlorocyclopropyl) compounds are useful as herbicides, insecticides, particularly as fumigants, plasticizers, lube oil additives and the like.

We claim:
1. A heterocyclic compound containing a 3-(2′,2′-dichlorocyclopropyl) group attached directly to a single carbon atom of the heterocyclic ring wherein the heterocyclic ring is selected from the class consisting of furan, pyrrole, thiophene and vinyl thiophene.
2. A compound as defined in claim 1 wherein the heterocyclic ring is furan.
3. A heterocyclic compound as in claim 1 wherein the heterocyclic ring is thiophene.
4. A heterocyclic compound as in claim 1 wherein the heterocyclic ring is vinylthiophene.

References Cited

UNITED STATES PATENTS

| | | | |
|---|---|---|---|
| 2,950,328 | 8/1960 | Orchin | 260—648 |
| 2,967,181 | 1/1961 | Herrick et al. | 260—290 |

HENRY R. JILES, Primary Examiner

C. M. SHURKO, Assistant Examiner

U.S. Cl. X.R.

71—88, 90, 94, 95, 98, 113, 114, 115, 121, 122, 123 126; 252—48.8, 51, 54, 58; 260—91.5, 290, 313.1, 346.1, 514, 515, 563, 598, 609, 617, 648, 649, 650, 654, 999